(12) United States Patent
Geraci et al.

(10) Patent No.: US 9,098,814 B2
(45) Date of Patent: Aug. 4, 2015

(54) AUTOMATIC LIVE PUBLISHER EVENT SYSTEM AND METHOD OF SAME

(75) Inventors: Frederic Geraci, Mouans Sartoux (FR); Tristan Bigourdan, Nice (FR)

(73) Assignee: Amadeus S.A.S., Biot (FR)

( * ) Notice: Subject to any disclaimer, the term of this patent is extended or adjusted under 35 U.S.C. 154(b) by 837 days.

(21) Appl. No.: 13/359,222

(22) Filed: Jan. 26, 2012

(65) Prior Publication Data

US 2013/0191470 A1 Jul. 25, 2013

(30) Foreign Application Priority Data

Jan. 24, 2012 (EP) .................................... 12305084

(51) Int. Cl.
  *G06F 15/16* (2006.01)
  *G06Q 10/02* (2012.01)
  *G06Q 50/30* (2012.01)
(52) U.S. Cl.
  CPC ................ *G06Q 10/02* (2013.01); *G06Q 50/30* (2013.01)
(58) Field of Classification Search
  CPC ...................................................... H04L 5/0461
  USPC .................................................. 709/204, 206
  See application file for complete search history.

(56) References Cited

U.S. PATENT DOCUMENTS

| | | | |
|---|---|---|---|
| 7,302,643 B1 * | 11/2007 | Edlund et al. ................. | 715/703 |
| 7,730,216 B1 | 6/2010 | Issa et al. | |
| 7,783,592 B2 | 8/2010 | Armstrong et al. | |
| 7,783,710 B2 | 8/2010 | Ramaswamy | |
| 7,958,192 B2 | 6/2011 | Harik et al. | |
| 2007/0161382 A1 | 7/2007 | Melinger et al. | |
| 2007/0266097 A1 | 11/2007 | Harik et al. | |
| 2007/0281716 A1 | 12/2007 | Altman et al. | |
| 2008/0005669 A1 * | 1/2008 | Eilertsen et al. .............. | 715/526 |
| 2008/0104227 A1 | 5/2008 | Birnie et al. | |
| 2008/0155080 A1 | 6/2008 | Marlow et al. | |
| 2008/0167937 A1 | 7/2008 | Coughlin et al. | |
| 2008/0255989 A1 | 10/2008 | Altberg et al. | |
| 2009/0070228 A1 | 3/2009 | Ronen | |
| 2009/0157439 A1 | 6/2009 | Fuchs | |

(Continued)

FOREIGN PATENT DOCUMENTS

WO   WO 2008/105766   9/2008

OTHER PUBLICATIONS

Extended European Search Report, mailed Jun. 21, 2012, EP Application No. 12305084.

*Primary Examiner* — Glenford Madamba
(74) *Attorney, Agent, or Firm* — Thompson Hine LLP

(57) ABSTRACT

An automatic live publisher event system and method interact with multiple travel reservation systems and social network applications, and instantaneously publishes a user's travel-related information in real-time upon the occurrence of an event regardless of whether the user is connected to the system. The system may parse information from reservations so that users do not have to manually enter information in the system to send to members of their social networks. The system may include an event journal repository, an event parser module, a media manager module, a publisher module and a GPS manager module, which are integrated with each other, and which may interface with a reservation system. The system facilitates the customization of content and communications media of a user's travel-related information associated with an event that is published and shared with multiple users via multiple communications media concurrently.

14 Claims, 3 Drawing Sheets

(56) References Cited

U.S. PATENT DOCUMENTS

| | | | |
|---|---|---|---|
| 2009/0168609 A1* | 7/2009 | Weir et al. .................. | 368/21 |
| 2009/0248807 A1 | 10/2009 | Fron et al. | |
| 2010/0056183 A1* | 3/2010 | Oh .......................... | 455/456.3 |
| 2010/0161727 A1 | 6/2010 | Shaffer et al. | |
| 2010/0228826 A1 | 9/2010 | Marlow et al. | |
| 2011/0035452 A1 | 2/2011 | Gittleman | |
| 2011/0161427 A1 | 6/2011 | Fortin et al. | |
| 2011/0161444 A1 | 6/2011 | Chauhan | |
| 2011/0225257 A1 | 9/2011 | Tilden et al. | |

* cited by examiner

| Trip to London Event 1 | | |
|---|---|---|
| Name | Media | Text- Picture |
| John Paul | Facebook | |
| John Paul | Email | |
| Chin Juan | Email | |
| Klin Edwards | SMS | |
| Sandra Wilcox | Twitter | |

800

| Product | Action List | Media | Message Personalization |
|---|---|---|---|
| AIR Product | Taking Off<br>Landing | Twitter/Facebook | 'I'm leaving my country'<br>'Welcome Frederic to US !' |
| | | SMS/Email | 'Bye Bye France' |
| Hotel Product | Check-In<br>Check-Out | All | 'Welcome in my new house'<br>'Bye-Bye my new house' |
| Car Product | Check-In<br>Check-Out | All | 'My new car is beautiful'<br>'I return my car' |
| Service Product | Type of Meal | All | 'I am eating on board, it's very good' |

AUTOMATIC LIVE PUBLISHER EVENT SYSTEM AND METHOD OF SAME

CLAIM FOR PRIORITY

This application claims priority under 35 USC 119 to European Application No. 12305084.1, filed on Jan. 24, 2012, which is incorporated by reference in its entirety.

BACKGROUND OF INVENTION

1. Technical Field

The present invention is directed to a computer-implemented integrated travel system that automatically publishes in real-time a user's travel-related information based on the occurrence of events to a user contact community through several media types (social network applications, mobile and web-based devices).

2. Background

Typical modern travel booking systems utilize passenger records which are associated with and contain information relating to specific bookings, such as a booked flight, which are stored in a reservation system. The passenger record may be a passenger name record ("PNR"), and the reservation system may be a global distribution system ("GDS"). A GDS is a computer reservation system typically utilized jointly by airlines in different countries, that includes reservation databases of suppliers in many countries.

Additionally, there are numerous systems and methods for integrating social networking information and for generating and sending location-based messages to members of a user's community, such as his or her social network. Many of these systems provide for the customization of both the content and media type of the communication messages, and further provide for the ability to determine the geo-position of a user, and the ability to communicate this information to members of a user's community, such as his or her social network.

However, these systems generally require users to stay connected with the system when communicating this information to the members of a user's social network, which is a problem when users do not have access to the internet. These systems do not seamlessly integrate social networks and travel reservations to provide for the automatic publication of information as events occur in real-time. Accordingly, the publication of information to one's social network community is often manual and is not instantaneous upon the occurrence of an event. Additionally, these systems generally do not seamlessly facilitate the automatic sharing of information to multiple users on multiple systems via multiple communications media concurrently.

SUMMARY

An automatic live publisher event system and method ("ALPES") may interact with multiple travel reservation systems and user contact communities, such as social networks, through different communication media (social media applications, phone, email, SMS/MMS messages), and instantaneously can publish a user's travel-related information in real-time upon the occurrence of an event regardless of whether the user is connected to the system. The system may interface with a reservation system so that a user's travel-related information may be obtained automatically from the reservation system. Accordingly, the system may parse information from reservations so that users do not have to manually enter information in the system to send to members of their community, such as their social networks. Furthermore, the automatic live publisher event system may prepare event journal logs at the time of reservation, which may facilitate fast access to multiple records simultaneously at the time the events occur for instantaneous publishing of the events in real-time. The system may interface with a reservation system, an event journal repository, an event parser module, a media manager module and a publisher module, which can be integrated with each other.

The automatic live publisher event system provides for the integration of multiple travel reservation systems, communications media, social networks and the management of multiple message data formats. For example, the system may publish a user's travel-related information via mobile messages, email messages, or social network applications, such as facebook, twitter, linked-in. The user may customize the message content of the event journal and communications media from the media manager, and accordingly, a user's travel-related information that is associated with events may be published and shared with multiple users via multiple communications media concurrently. This system facilitates the preparation of future publication of a user's travel-related information.

In one aspect, a reservation system may store a user's passenger record containing travel-related information. An event parser module may automatically parse travel-related information from a user's passenger records for creation of events associated with the product reservation; several events may be associated with each reservation, such as flight takeoff and arrival, and hotel check in and check out. The reservation system and the event parser module may communicate with each other as such that a user is not required to manually enter travel-related information, as the user's travel-related information may be accessed, retrieved and modified automatically from the reservation system. The travel-related information may relate to reservations for airfare, hotels, cars and other means of transportation, service events, or recreation or leisure activities. The automatic live publisher event system may generate an event journal comprising the travel-related information for a user's events. The generated event journal may be stored in an event journal repository, may be built automatically when the reservation is confirmed, and may contain the date of the reservation, reservation name, provider name, start date, end date, or point of contact.

In another aspect, a media manager module may customize the message content of the event journal and communications media to facilitate the preparation of future publication of the event journal automatically when the associated events occur in real-time. Accordingly, the media manager module may customize and select communications media associated with such events. The media manager module may customize the message content of the event journal and communications media, such that, a user's travel-related information that is associated with events may be published and shared with multiple users via multiple communications media concurrently. The communications media may include mobile messages, email messages, social network applications such as facebook, twitter, linked-in. The automatic live publisher event system may be communications media neutral, and specific media implementation may implement specific behavior. Accordingly, for a particular event, there may be potentially multiple communication data messages associated with and sent concurrently in real-time via multiple communication channels.

Specifically, the publisher module may manage the automatic publication of event journals, and the media manager module registers the specific communications media associated with a publication, and may customize the text or content of the publication, prior to the occurrence of an event; the notification regarding a user's travel-related data is from the traveler user to his or her contact community. The media manager module may retrieve a list of members of a user's social network, and may associate a particular communications media type(s) to events extracted from a travel reservation. Additionally, the media manager module may further customize the ultimate publication of the generated event journal by the automatic live publisher event system. The actual text of the publication message may be customized, and a particular picture may be uploaded for specific event, such as a city picture, a hotel picture; each message format may be dependent on the associated media. For example, a user may want to send a mobile message such as an SMS message for taking off and landing events to family members and a facebook message to members of the user's facebook community for such events. Further, through the media manager module, the user may allow or deny specific publication of such events on a per-event or per recipient user basis.

In yet another aspect, a publisher module may automatically and instantaneously publish travel-related information real-time upon the occurrence of events associated with the travel-related information. Specifically, the automatic live publisher event system may dynamically update and automatically publish a system generated event journal upon the occurrence of the associated event, regardless of whether the user is connected to the system at the time of the occurrence of the event. Additionally, the system may interface with a reservation system such that an event journal is automatically updated based on updates to a reservation associated with the event. The publisher module may publish the travel-related information associated with an event to multiple users via multiple communications media concurrently. The system may utilize multi-thread architecture and massive storage to support the publication of many concurrent events.

In one embodiment, the publisher module may integrate a validation step. Specifically, the publisher module may publish the event journal upon manual verification by the user. For example, a user may be required to confirm the publication of an event via a system generated confirmation message. Additionally, the system may verify the location of a user prior to the publication of an event journal via a GPS manager module that geo-localizes the user. For example, if a user is supposed to be landing in a particular city, the system will check the real position of the user before publishing the associated event journal. In yet another embodiment, a user may manually create an event journal to be published based on the occurrence of an associated event; specifically, users may manually add events for the publisher module to publish to the user's community.

The details of one or more embodiments are set forth in the following detailed description of the invention and the accompanying drawings. Other objectives, features, and advantages of the invention will be more readily understood upon consideration of the following detailed description of the invention, taken in conjunction with the accompanying drawings, and with the claims.

BRIEF DESCRIPTION OF THE DRAWINGS

The present invention is further described in the detailed description which follows, in reference to the noted plurality of drawings by way of non-limiting examples of certain embodiments of the present invention, in which like numerals represent like elements throughout the several views of the drawings, and wherein:

FIG. 3 depicts the customization of content and communications media of the system generated event journal for concurrent publishing to multiple users via multiple communications media.

DETAILED DESCRIPTION

An automatic live publisher event system and method interacts with multiple travel reservation systems and user communities (through social network applications, web-based and mobile messaging), and instantaneously publishes a user's travel-related information in real-time upon the occurrence of an event regardless of whether the user is connected to the system. The system parses information from a traveler user's reservations, which may be stored in a reservation system, so that users do not have to manually enter information in the system to send to members of their user community. The automatic live publisher event system prepares event journal logs at the time of reservation. The system may include an event journal repository, an event parser module, a media manager module and a publisher module, which are integrated with each other, and which may interface with a reservation system.

Figure 1:
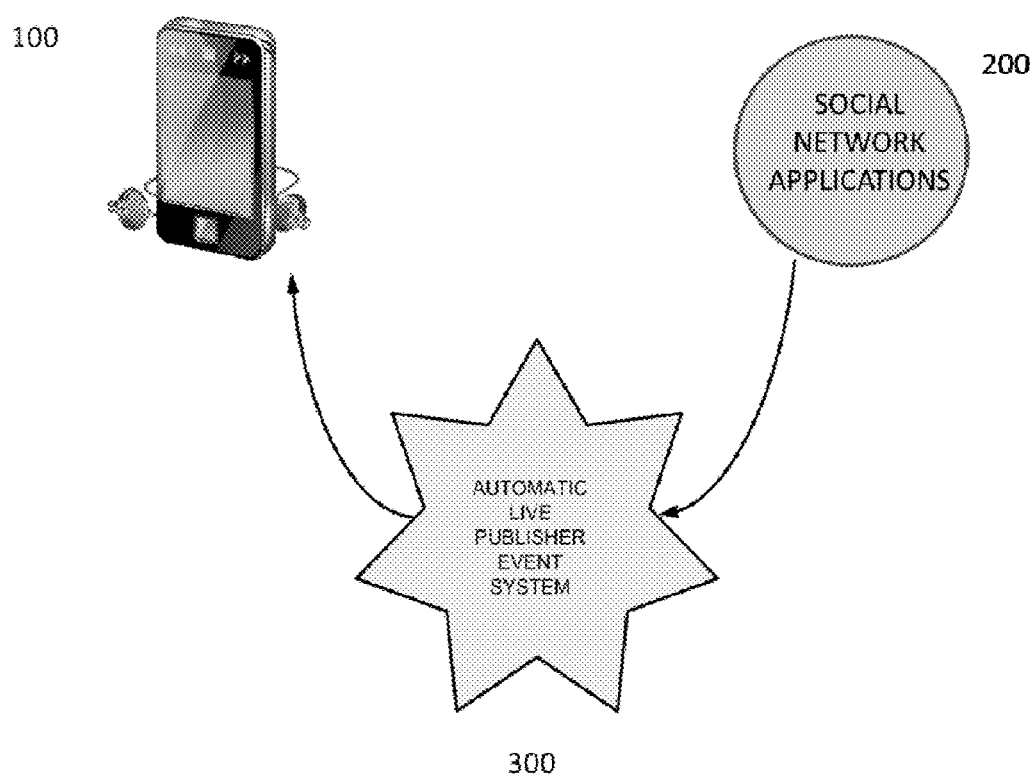
FIG. 1 illustrates an automatic live publisher event system which interacts with multiple travel reservation systems and user communities (through social network applications, web-based and mobile messaging), and instantaneously publishes a user's travel-related information in real-time upon the occurrence of an event regardless of whether the user is connected to the system.

Referring to FIG. 1, the automated live publisher event system 300 allows users to automatically share travel-related information among multiple devices 100, including web and mobile-based devices, and across multiple social network applications 200, to instantaneously publish a user's travel-related information based on the occurrence of an event, regardless of whether the user is connected to the system. The system facilitates the automatic publishing of a user's travel-related information associated with an event for seamless sharing with multiple users via multiple communications media concurrently.

Figure 2:
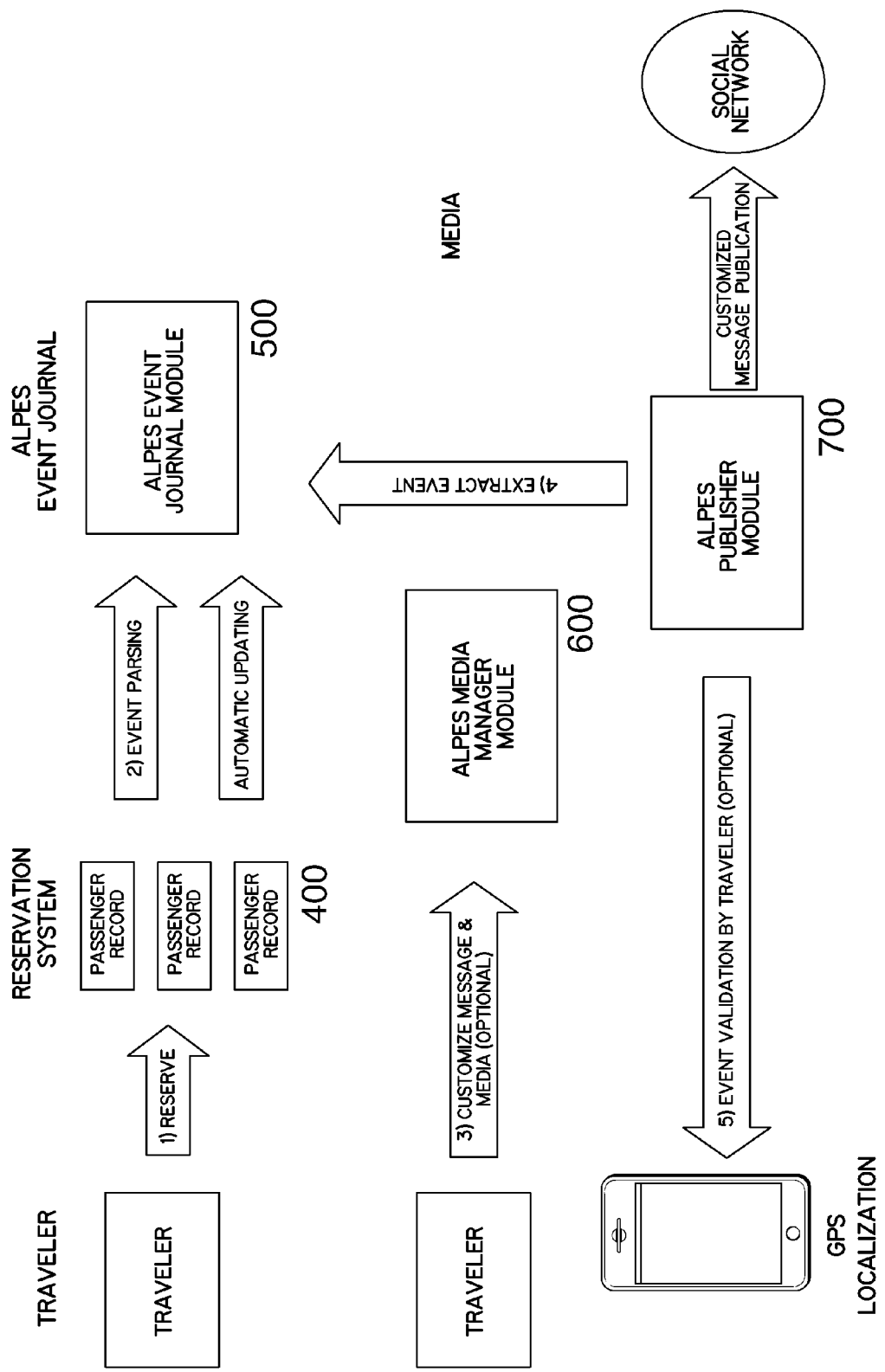
FIG. 2 illustrates an exemplary automatic live publisher event system and its components comprising therein.

Referring to FIG. 2, the automatic live publisher event system includes an event journal repository, an event parser module 500, a media manager module 600 and a publisher module 700, which are integrated with each other, and which may interface with a reservation system 400.

A reservation system 400 stores a traveler user's passenger record containing travel-related information. An event parser module 500 automatically parses travel-related information from a user's passenger records events associated with a reservation at the time a passenger record is created or updated. The event parser extracts travel-related from a user's passenger records to parse the reservation to identify potential events such as air products, hotel products, car products and service events; several events may be associated with each reservation The reservation system 400 and the event parser module 500 interface with each other, and accordingly, a user is not required to manually enter travel-related information, as the user's travel-related information may be accessed and retrieved automatically from the reservation system. The travel-related information may relate to reservations for airfare, hotels, cars and other means of transportation, service events, or activities. The automatic live publisher event system may generate an event journal comprising the travel-related information for a user's event. The generated event journal may be stored in an event journal repository, may be built automatically when the reservation is confirmed, and may contain the date of the reservation, reservation name, provider name, start date, end date, or point of contact.

A media manager module 600 customizes the content and communications media of the event journal to facilitate the preparation of future publication of the event journal automatically when the associated event occurs in real-time. Accordingly, the media manager module 600 customizes and selects communications media associated with such events. The media manager module may allow for the customization of the content and communications media of the event journal, by enabling a user to perform, prepare and store customized messages, such that, a user's travel-related information that is associated with events may be published and shared with multiple users via multiple communications media concurrently. The communications media may include mobile messages, email messages, or social network applications such as facebook, twitter, linked-in. The automatic live publisher event system may be communications media neutral, and specific media implementation may implement specific behavior.

Specifically, the publisher module 700 manages the automatic publication of event journals, and the media manager module 600 registers the specific communications media associated with a publication and customizes the text or content of the publication. The media manager module 600 retrieves a list of members of a user's social network, and associates a default particular communications media type(s) to events extracted from a travel reservation, which may be customized by a user. Additionally, the media manager module may further customize the ultimate publication of the generated event journal by the automatic live publisher event system. The actual text of the publication message may be customized, and a particular picture may be uploaded for specific events, such as a city picture, a hotel picture; each message format may be dependent of the associated media. Accordingly, for a particular travel related action such as a plane taking off or landing, or a user checking in or checking out to his or her flight or hotel, the media of the publication message may be customized, as well as the message itself. For example, a user may want to send a mobile message such as an SMS message for taking off and landing events to family members and a facebook message to members of the user's facebook community for such events. Further, through the media manager module, the user may allow or deny specific publication of such events on a per-event or per recipient user basis.

A publisher module 700 automatically and instantaneously publishes travel-related information real-time upon the occurrence of the extracted events associated with the travel-related information. The automatic live publisher event system dynamically updates and automatically publishes a system generated event journal upon the occurrence of the associated event, regardless of whether the user is connected to the system at the time of the occurrence of events. Additionally, the system may interface with a reservation system such that an event journal is automatically updated based on updates to a reservation associated with the event. Accordingly, the publisher module 700 publishes the travel-related information associated with events via a customized message publication to multiple users via multiple communications media concurrently. The system may utilize multi-thread architecture and massive storage to support the publication of many concurrent events. In yet another embodiment, a user may manually create an event journal to be published based on the occurrence of an associated event; specifically, users may manually add events for the publisher module to publish to the user's community.

In one embodiment, the publisher module may integrate a validation step. Specifically, the publisher module may publish the event journal upon manual verification by the user. For example, a user may be required to confirm the publication of an event via a system generated confirmation message. During real time publishing execution, the system may ask a confirmation by a popup message to the user's smartphone. Additionally, the system may verify the location of a user prior to the publication of an event journal via a GPS manager module that geo-localizes the user, by identifying the real-world geographic location of an object, such as a radar, mobile phone or an Internet-connected computer terminal. The GPS manager module verifies the user's GPS position to verify the event. For example, if a user is supposed to be landing in a particular city, the system will check the real position of the user before publishing the associated event journal.

Referring to FIG. 3, the automatic live publisher event system facilitates the customization of content and communications media of the system generated event journal for concurrent publishing to multiple users via multiple communications media 800. The actual text of the publication message may be customized, and a particular picture may be uploaded for specific event, such as a city picture, a hotel picture; each message format may be dependent of the associated media. For example, a user may want to send a mobile message such as an SMS message for taking off and landing events to family members and a facebook message to members of the user's facebook community for such events. Further, through the media manager module, the user may, per-event, and per recipient user, allow or deny specific publication of such events. Accordingly, for a particular travel-related action, the media type may be customized, and the published message may be personalized 900.

The automatic live publisher event techniques, methods, and systems described above can be implemented in part or in whole using computer-based systems and methods. Additionally, computer-based systems and methods can be used to augment or enhance the functionality described above, increase the speed at which the functions can be performed, and provide additional features and aspects as a part of or in addition to those described elsewhere in this document. Various computer-based systems, methods and implementations in accordance with the above-described technology are presented below.

In one implementation, a general-purpose computer can have an internal or external memory for storing data and programs such as an operating system (e.g., DOS, Windows 2000™, Windows XP™, Windows NT™, OS/2, UNIX, Linux, Android, iOS, or Mac OS X) and one or more application programs. Examples of application programs include computer programs implementing the techniques described herein, authoring applications (e.g., word processing programs, database programs, spreadsheet programs, or graphics programs) capable of generating documents or other electronic content; client applications (e.g., an Internet Service Provider (ISP) client, an e-mail client, or an instant messaging (IM) client) capable of communicating with other computer users, accessing various computer resources, and viewing, creating, or otherwise manipulating electronic content; and browser applications (e.g., Microsoft's Internet Explorer) capable of rendering standard Internet content and other content formatted according to standard protocols such as the Hypertext Transfer Protocol (HTTP), HTTP Secure, Secure Hypertext Transfer Protocol.

One or more of the application programs can be installed on the internal or external storage of the general-purpose computer. Alternatively, in another implementation, application programs can be externally stored in or performed by one or more device(s) external to the general-purpose computer.

The general-purpose computer includes a central processing unit (CPU) for executing instructions in response to commands, and a communication device for sending and receiving data. One example of the communication device is a modem. Other examples include a transceiver, a communication card, a satellite dish, an antenna, a network adapter, network interface card, mobile interne device, or some other mechanism capable of transmitting and receiving data over a communications link through a wired or wireless data pathway.

The general-purpose computer can include an input/output interface that enables wired or wireless connection to various peripheral devices. Examples of peripheral devices include, but are not limited to, a mouse, a mobile phone, a personal digital assistant (PDA), a smartphone, a tablet computer, a keyboard, a display monitor with or without a touch screen input, and an audiovisual input device. In another implementation, the peripheral devices can themselves include the functionality of the general-purpose computer. For example, the mobile phone or the PDA can include computing and networking capabilities and function as a general purpose computer by accessing the delivery network and communicating with other computer systems. Examples of a delivery network include the Internet, the World Wide Web, WANs, LANs, analog or digital wired and wireless telephone networks (e.g., Public Switched Telephone Network (PSTN), Integrated Services Digital Network (ISDN), and Digital Subscriber Line (xDSL)), radio, television, cable, or satellite systems, and other delivery mechanisms for carrying data. A communications link can include communication pathways that enable communications through one or more delivery networks.

In one implementation, a processor-based system (e.g., a general-purpose computer) can include a main memory, preferably random access memory (RAM), and can also include a secondary memory. The secondary memory can include, for example, a hard disk drive or a removable storage drive, representing a floppy disk drive, a magnetic tape drive, an optical disk drive (Blu-Ray, DVD, CD drive), magnetic tape, paper tape, punched cards, standalone RAM disks, Iomega Zip drive, or flash memory devices including memory cards, USB flash drives, solid-state drives, etc. The removable storage drive reads from or writes to a removable storage medium. A removable storage medium can include a floppy disk, magnetic tape, optical disk (Blu-Ray disc, DVD, CD) a memory card (CompactFlash card, Secure Digital card, Memory Stick), paper data storage (punched card, punched tape), etc., which can be removed from the storage drive used to perform read and write operations. As will be appreciated, the removable storage medium can include computer software or data.

In alternative embodiments, the secondary memory can include other similar means for allowing computer programs or other instructions to be loaded into a computer system. Such means can include, for example, a removable storage unit and an interface. Examples of such can include a program cartridge and cartridge interface (such as the found in video game devices), a removable memory chip (such as an EPROM or PROM) and associated socket, and other removable storage units and interfaces, which allow software and data to be transferred from the removable storage unit to the computer system.

In one embodiment, the computer system can also include a communications interface that allows software and data to be transferred between computer system and external devices. Examples of communications interfaces can include a modem, a network interface (such as, for example, an Ethernet card), a communications port, and a PCMCIA slot and card. Software and data transferred via a communications interface are in the form of signals, which can be electronic, electromagnetic, optical or other signals capable of being received by a communications interface. These signals are provided to communications interface via a channel capable of carrying signals and can be implemented using a wireless medium, wire or cable, fiber optics or other communications medium. Some examples of a channel can include a phone line, a cellular phone link, an RF link, a network interface, and other suitable communications channels.

In this document, the terms "computer program medium" and "computer usable medium" are generally used to refer to media such as a removable storage device, a disk capable of installation in a disk drive, and signals on a channel. These computer program products provide software or program instructions to a computer system.

Computer programs (also called computer control logic) are stored in the main memory or secondary memory. Computer programs can also be received via a communications interface. Such computer programs, when executed, enable the computer system to perform the features as discussed herein. In particular, the computer programs, when executed, enable the processor to perform the described techniques. Accordingly, such computer programs represent controllers of the computer system.

In an embodiment where the elements are implemented using software, the software can be stored in, or transmitted via, a computer program product and loaded into a computer system using, for example, a removable storage drive, hard drive or communications interface. The control logic (software), when executed by the processor, causes the processor to perform the functions of the techniques described herein.

In another embodiment, the elements are implemented primarily in hardware using, for example, hardware components such as PAL (Programmable Array Logic) devices, application specific integrated circuits (ASICs), or other suitable hardware components. Implementation of a hardware state machine so as to perform the functions described herein will be apparent to a person skilled in the relevant art(s). In yet another embodiment, elements are implanted using a combination of both hardware and software.

In another embodiment, the computer-based methods can be accessed or implemented over the World Wide Web by providing access via a Web Page to the methods described herein. Accordingly, the Web Page is identified by a Universal Resource Locator (URL). The URL denotes both the server and the particular file or page on the server. In this embodiment, it is envisioned that a client computer system interacts with a browser to select a particular URL, which in turn causes the browser to send a request for that URL or page to the server identified in the URL. Typically the server responds to the request by retrieving the requested page and transmitting the data for that page back to the requesting client computer system (the client/server interaction is typically performed in accordance with the hypertext transport protocol or HTTP). The selected page is then displayed to the user on the client's display screen. The client can then cause the server containing a computer program to launch an application to, for example, perform an analysis according to the described techniques. In another implementation, the server can download an application to be run on the client to perform an analysis according to the described techniques.

A number of embodiments of the invention have been described. Nevertheless, it will be understood that various modifications may be made without departing form the spirit and the scope of the invention.

The invention claimed is:

1. A system for publishing information relating to one or more events associated with a travel reservation, the system comprising:
a computer processor; and
a memory storing instructions that, upon execution by the computer processor, cause the system to:
parse a passenger record that is stored in a reservation system and relates to the travel reservation for at least a portion of the one or more events associated with the travel reservation;
generate at least one event journal that includes data relating to the one or more events associated with the travel reservation;
automatically determine that an event of the one or more events has occurred upon the occurrence of the event; and
after determining that the event has occurred:
publish content relating to the occurrence of the event to multiple users via multiple communications media concurrently via at least one email message, at least one mobile message, and at least one social network application; and
update the at least one event journal based upon the occurrence of the event,
wherein the instructions causing the system to automatically determine that the event of the one or more events has occurred comprises instructions that, upon execution, cause the system to:
prior to publishing the content related to the occurrence of the event, verify a location of a traveler associated with the travel reservation via a GPS manager module.

2. The system of claim 1, wherein the instructions, upon execution, further cause the system to:
receive one or more events manually added by a user, wherein the one or more events associated with the travel reservation include the one or more manually added events.

3. A method for publishing information relating to one or more events associated with a travel reservation, the method comprising:
parsing, by a computer processor, a passenger record that is stored in a reservation system and relates to the travel reservation for at least a portion of the one or more events associated with the travel reservation;
generating, by the computer processor, at least one event journal comprising data relating to the one or more events associated with the travel reservation;
automatically determining, by the computer processor, that an event of the one or more events has occurred upon the occurrence of the event; and
after determining that the event has occurred:
updating, by the computer processor, said at least one event journal based upon the occurrence of the event; and
publishing, by the computer processor, content relating to the occurrence of the event to multiple users via multiple communications media concurrently via at least one email message, at least one mobile message, and at least one social network application,
wherein automatically determine that the event of the one or more events has occurred comprises:
prior to publishing the content related to the occurrence of the event, verifying a location of a traveler associated with the travel reservation via a GPS manager module.

4. The method of claim 3, further comprising:
receiving one or more events manually added by a user, wherein the one or more events associated with the travel reservation include the one or more manually added events.

5. The method of claim 3, further comprising:
determining that the passenger record stored in the reservation system and related to the travel reservation system has been updated; and
in response to determining that the passenger record has been updated, automatically updating said one or more events associated with the travel reservation and the at least one event journal based on the updated passenger record.

6. The system of claim 1, wherein the instructions, upon execution, further cause the system to:
in response to determining that the event has occurred, request and receive a manual validation from a user, wherein the instructions, upon execution, cause the system to publish the content relating to the occurrence of the event in response to receiving the manual validation from the user.

7. The system of claim 1, wherein the instructions, upon execution, cause the system to publish the content relating to the occurrence of the event automatically in response to determining that the event has occurred.

8. The system of claim 1, wherein the instructions, upon execution, further cause the system to:
determine that the passenger record stored in the reservation system and related to the travel reservation has been updated; and
in response to determining that the passenger record has been updated, automatically update the one or more events associated with the travel reservation and the at least one event journal based on the updated passenger record.

9. The method of claim 3, further comprising:
in response to determining that the event has occurred, requesting and receiving a manual validation from a user, wherein the content relating to the occurrence of the event is published in response to receiving the manual validation from the user.

10. The method of claim 3, wherein the content relating to the occurrence of the event is automatically published in response to determining that the event has occurred.

11. The system of claim 7, wherein the instructions, upon execution, cause the system to automatically publish the content relating to the occurrence of the event regardless of whether a user is connected to the system.

12. The method of claim 10, wherein the content relating to the occurrence of the event is automatically published regardless of whether a user is connected to a system that includes the computer processor.

13. The system of claim 1, wherein the instructions, upon execution, further cause the system to:
receive customization data for the content relating to the occurrence of the event from a user, wherein the content relating to the occurrence of the event is based on the received customization data.

14. The method of claim 3, further comprising:
receiving customization data for the content relating to the occurrence of the event from a user, wherein the content relating to the occurrence of the event is based on the received customization data.

\* \* \* \* \*